United States Patent
Blalock et al.

(10) Patent No.: US 10,013,833 B2
(45) Date of Patent: Jul. 3, 2018

(54) TRANSPONDER KEY REPLICATION

(71) Applicant: RB Distribution, Inc., Colmar, PA (US)

(72) Inventors: Christopher Blalock, Fountainville, PA (US); Michael DiGregorio, Telford, PA (US); Matthew Barnard, Landsdale, PA (US); Brandon Graver, Lansdale, PA (US)

(73) Assignee: RB Distribution, Inc., Colmar, PA (US)

( * ) Notice: Subject to any disclaimer, the term of this patent is extended or adjusted under 35 U.S.C. 154(b) by 391 days.

(21) Appl. No.: 14/215,904

(22) Filed: Mar. 17, 2014

(65) Prior Publication Data

US 2014/0259582 A1 Sep. 18, 2014

Related U.S. Application Data

(60) Provisional application No. 61/794,886, filed on Mar. 15, 2013.

(51) Int. Cl.
*G07C 9/00* (2006.01)
*B23C 3/35* (2006.01)
*H04N 7/18* (2006.01)

(52) U.S. Cl.
CPC ............ *G07C 9/00857* (2013.01); *B23C 3/35* (2013.01); *H04N 7/183* (2013.01); *G07C 2009/0088* (2013.01); *Y10T 29/442* (2015.01)

(58) Field of Classification Search
CPC ........ G07C 9/00857; G07C 2009/0088; Y10T 29/442
See application file for complete search history.

(56) References Cited

U.S. PATENT DOCUMENTS

| | | | |
|---|---|---|---|
| 6,543,972 B1 * | 4/2003 | Cimino | G06K 9/2036 250/202 |
| 8,626,331 B2 | 1/2014 | Marsh et al. | |
| 8,682,468 B2 | 3/2014 | Marsh et al. | |
| 2006/0044109 A1 * | 3/2006 | Griffits | E05B 17/103 340/5.65 |
| 2011/0262240 A1 | 10/2011 | Mutch et al. | |
| 2012/0154127 A1 | 6/2012 | Donadini | |
| 2013/0039530 A1 * | 2/2013 | Manigault | G07C 9/00857 382/100 |

OTHER PUBLICATIONS

2013 Comprehensive Catalog from Strattec, 84 pgs.

* cited by examiner

*Primary Examiner* — James Yang

(74) *Attorney, Agent, or Firm* — Volpe and Koenig, P.C.

(57) ABSTRACT

A method and apparatus for replicating a transponder key is disclosed. The transponder replication device includes an antenna that reads a transponder code from a transponder key; a camera, wherein the camera captures a bitting characteristic of the transponder key blade; a stabilizer that secures the transponder key in place while the camera captures the bitting characteristic; a memory device for storing the transponder data; means for transmitting the transponder code and the bitting characteristic of the transponder key blade to a remote location; and, a remote communication device that is compatible with the internet communications device that receives the transponder data and transmits it to a transponder duplication device at the remote location.

2 Claims, 6 Drawing Sheets

TRANSPONDER KEY REPLICATION

CROSS REFERENCES TO RELATED APPLICATIONS

This application claims the benefit of U.S. Provisional Application No. 61/794,886, filed Mar. 15, 2013, the contents of which is incorporated by reference herein.

BACKGROUND

Theft deterrent systems in today's automobiles have evolved to include the use of "High Security" keys. Such keys include transponder technology that require an electronic "handshake" with the automobile and, in many cases, a more sophisticated "side-mill" key cut instead of the more familiar "edge-cut". Most duplication equipment found in hardware stores and in department stores offering key cutting services is not capable of machining these side-mill key cuts. Also, duplication equipment found in hardware stores, locksmith shops, car dealerships, etc may extract a transponder code from a key and may then program a replacement transponder with the extracted code. The duplication equipment may finally cut a key on site in accordance with the "bitting" characteristics found by "tracing" the key being duplicated or by entering a key code that has been purchased from a key code service provider. Such a replication process requires the business providing the duplication service to own or to have immediate access to the duplication equipment referred to above.

This on site replication process is prohibitively expensive. Accordingly, a less expensive alternative to this on site replication process is desired. Examples of the state of the art can be found in US Published Application 2012/0154127 A1 and the 2013 Comprehensive Catalog from Strattec. These documents are incorporated herein by way of background to the current difficulties that are solved by the present invention.

SUMMARY

A method and apparatus for replicating a transponder key is disclosed. The transponder replication device includes an antenna that reads a transponder code from a transponder key; a camera, wherein the camera captures a bitting characteristic of the transponder key blade; a stabilizer that secures the transponder key in place while the camera captures the bitting characteristic; a memory device for storing the transponder data; means for transmitting the transponder code and the bitting characteristic of the transponder key blade to a remote location; and, a remote communication device that is compatible with the internet communications device that receives the transponder data and transmits it to a transponder duplication device at the remote location.

BRIEF DESCRIPTION OF THE DRAWING(S)

DETAILED DESCRIPTION

The invention will be described with reference to the Figures in which like reference numbers represent the same or similar elements.

It has been found that a bifurcated replication process may be employed to provide the desired transponder in a less expensive manner. In this process, there is a vendor location where the transponder information is collected and a second location where that information is applied. In the contemplated process, the duplication process is performed at a vendor's premises, that information is transmitted to a remote facility where a duplicate blank key is programmed with an extracted transponder code and physically cut with the bitting characteristics of the original key.

The device that captures the original transponder code preferably transmits that information to the remote location for processing. Once the information is at the remote location, software applies this information to create a new transponder key to be cut and programmed. Once cut and programmed, the key is preferably shipped to the vendor's customer.

Figure 1:
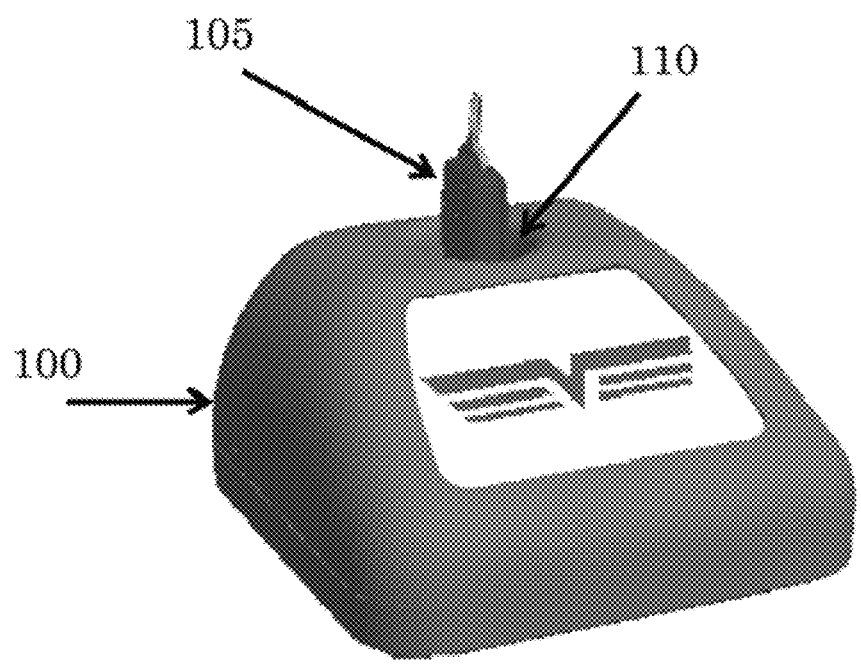
FIG. 1 illustrates one form of a transponder key replication device.

With reference to FIG. 1, the transponder key 105 to be replicated is placed inside the transponder key replication device 100 via a slot 110.

Figure 2:
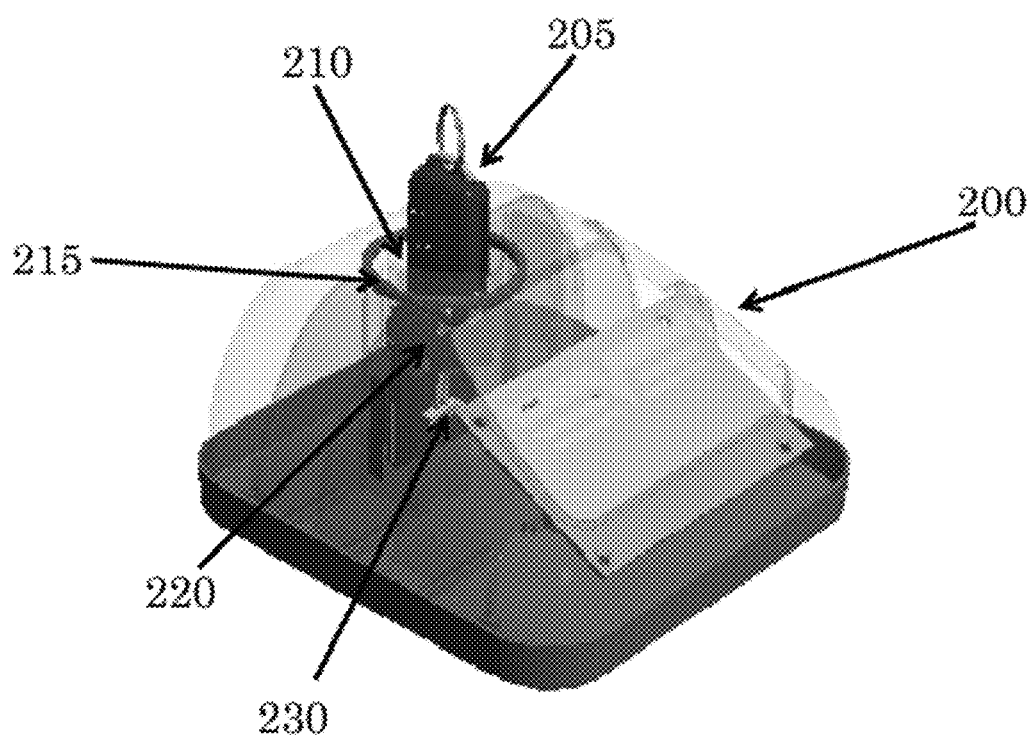
FIG. 2 shows the transponder key replication device of FIG. 1 with a transparent lid.

FIG. 2 is an example of the transponder key replication device with a transparent lid. The transponder key 205 is placed inside the transponder key replication device 200. The transponder key 205 fits in the center of slot 210. The slot 210 has an antenna 215 which surrounds the slot 210. The antenna 215 works in conjunction with a program board (not shown in this Figure) to read a transponder code of the transponder key 205. As the transponder key 205 is inserted into the transponder key replication device 200, it fits into a stabilizer 220. The stabilizer 220 is shown in further detail in FIG. 4 below. The transponder key 205 fits into slot 210 and slides down through the stabilizer 220 until it hits the stopper 230. The stabilizer 220 keeps the transponder key 205 in place while a camera 425 (shown in further detail in FIGS. 3 and 4 below) takes a picture of the transponder key 205 and the antenna 215 reads the transponder code.

Figure 3:
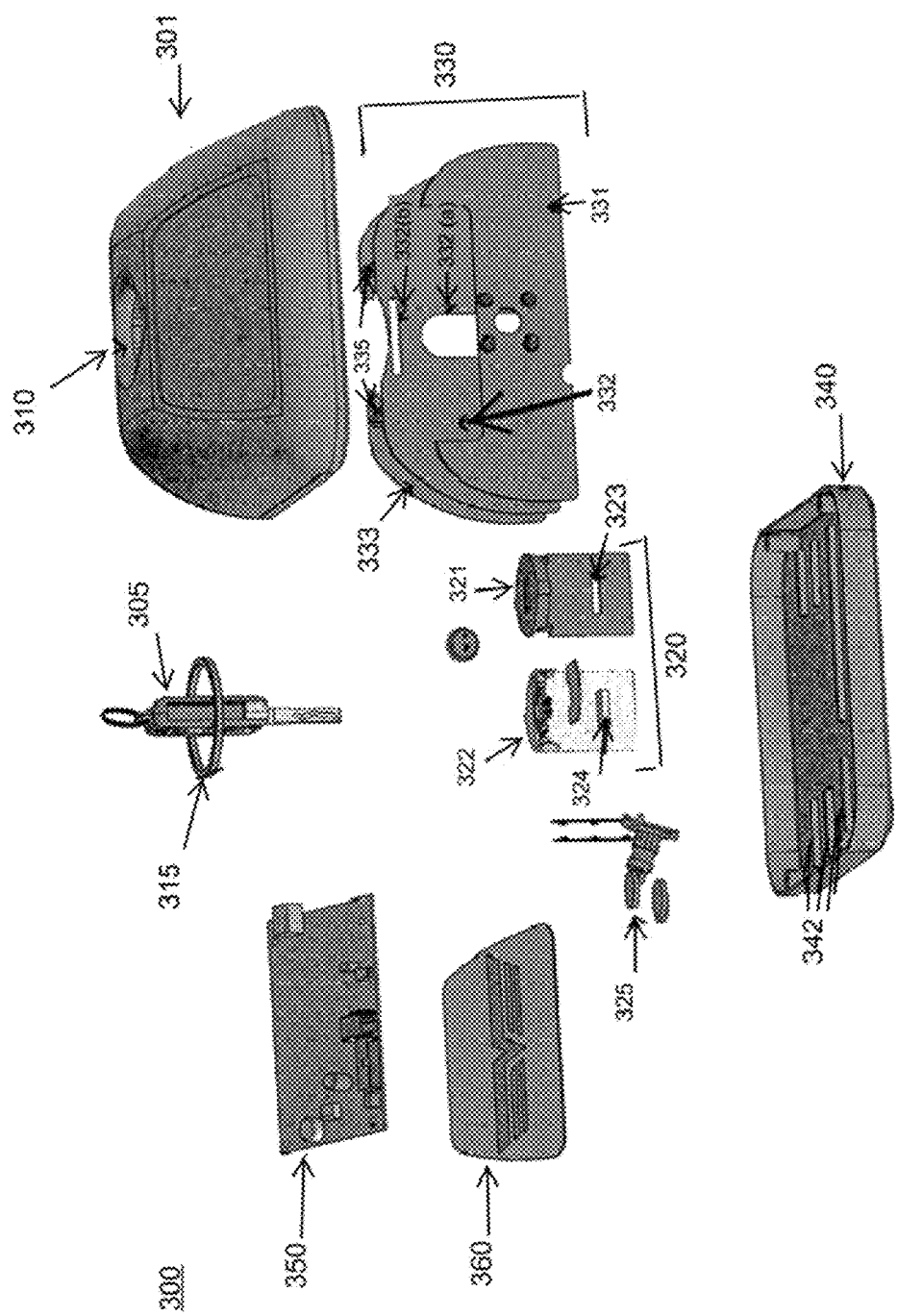
FIG. 3 is an exploded view of the components of the transponder key replication device.

With reference to FIG. 3, there is shown is an exploded view of the transponder key replication device 300. The transponder key replication device 300 includes an outer shell 301 and a bottom 340. The outer shell 301 includes a slot 310. The bottom 340 of the transponder key replication device 300 includes notches 342. The notches 342 in the bottom 340 provide support for the mounting plate 330. The mounting plate 330 has three pieces 331, 332, and 333, each of which has its own function. The first piece 331 is used to mount the camera 325. The second piece 332 is a screen to block light. The second piece 332 includes a light hood 332(a) and a slit 332(b) to hold the antenna 315 in place. The third piece 331 has two notches to hold the antenna 315 in place. In between the second piece 332 and the third piece 333 are two Light Emitting Diode (LED) lights 335. The LED lights 335 project light onto the transponder key 305 to allow the camera 325 to photograph the bitting characteristics on the transponder key 305 blade. The stabilizer 320 includes a front piece 321 and a back piece 322. The front piece 321 fits into the back piece 322 so that the front piece 321 encloses the springs (shown in further detail in FIG. 4 below) attached to the back piece 322. The back piece 322 includes the stopper 230. The front piece 321 includes a slot 323 to accept the stopper 230 when the front piece 321 and back piece 322 are joined together to form the stabilizer 320.

The program board 350 in FIG. 3 preferably includes sufficient memory to store the data from multiple transponders and a communications module for communicating in know internet protocols. The information from interrogated transponders is stored in memory until the unit is returned and is confirmed to be operating properly. As noted in the background, it is not unknown to have data errors in such an endeavor. Once the information is communicated over the internet to the production facility, the data is loaded into the memory of the reproduction unit which will function in much the same manner as the devices that are used to produce duplicate keys at a single site. Through the disclosed invention, an investment in the production equipment is no longer necessary since that function is centralized.

When the new transponder is ready it can be tested in the vehicle, and if there is any difficulty with its operation, it may be compared to the previously stored data in the memory of the program board 350.

Figure 4:
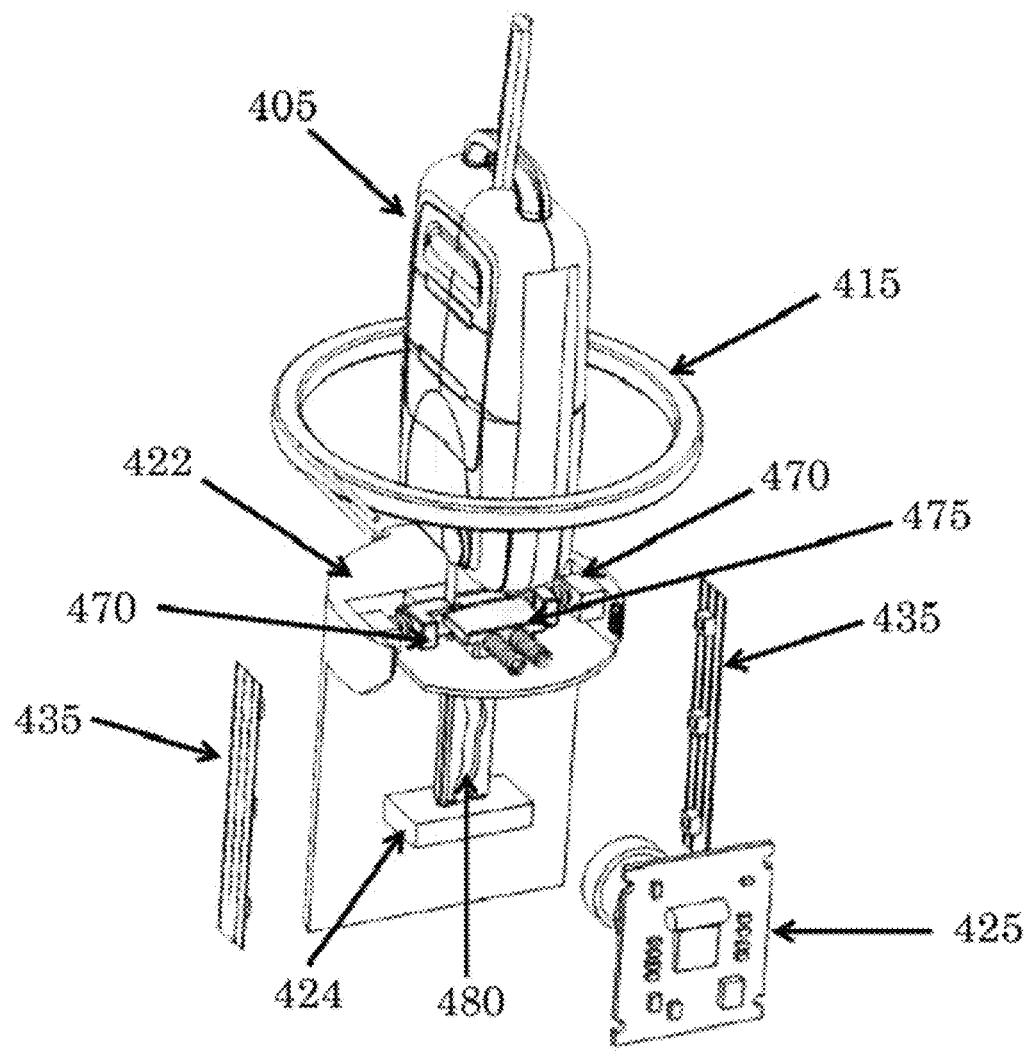
FIG. 4 is an exploded view of the key stabilizer.

FIG. 4 is an example of the transponder key inserted in the stabilizer. The transponder key 405 is inserted into the back piece 422 of the stabilizer through the antenna 415. The transponder key 405 slides through springs 470 and 475 of the back piece 422 of the stabilizer and rests on the stopper 424. The springs 470 and 475 keep the transponder key 405 in place. The side springs 475 center the transponder key 405 in the stabilizer to ensure that the camera 425 gets an accurate picture of the bitting characteristics 480. The front spring 470 pushes the transponder key 405 as far back as possible to keep the transponder key 405 steady. The antenna 415 reads the transponder code off the transponder key 405 and the camera 425 captures an image of the bitting characteristics 480 on the transponder key 405 blade. The LED lights 435 provide adequate light for the camera 425 to capture the image of the bitting characteristics 480 on the transponder key 405 blade.

Figure 5:
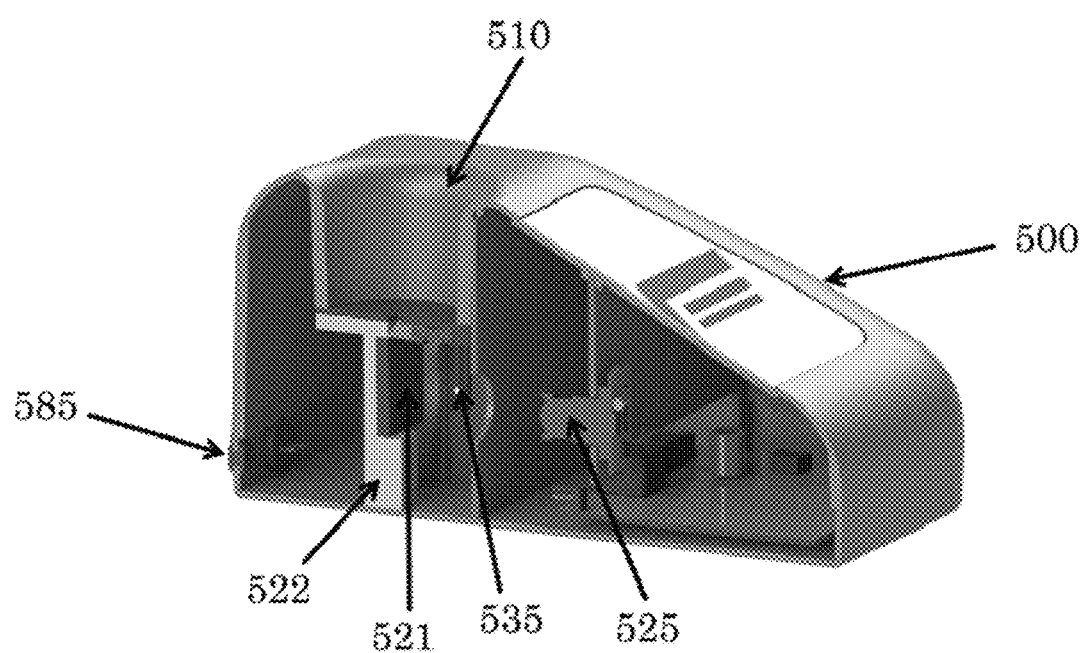
FIG. 5 is a sectional view of the transponder key replication device.

FIG. 5 illustrates an example inside configuration of the transponder key replication device. The transponder key replication device 500 includes slot 510. As the transponder key (not shown) is inserted into the transponder key replication device 500, it fits into the springs of the stabilizer (front piece 521 and back piece 522). As illustrated in FIG. 5, the front piece 522 of the stabilizer is black, which is needed to provide sufficient contrast for the camera 525. The LED lights 535 project light onto the transponder key (not shown) to allow the camera 525 to photograph the bitting characteristics on the transponder key blade. The back of the transponder key replication device 500 has a connector 585 (shown in more detail in FIG. 6).

Figure 6:
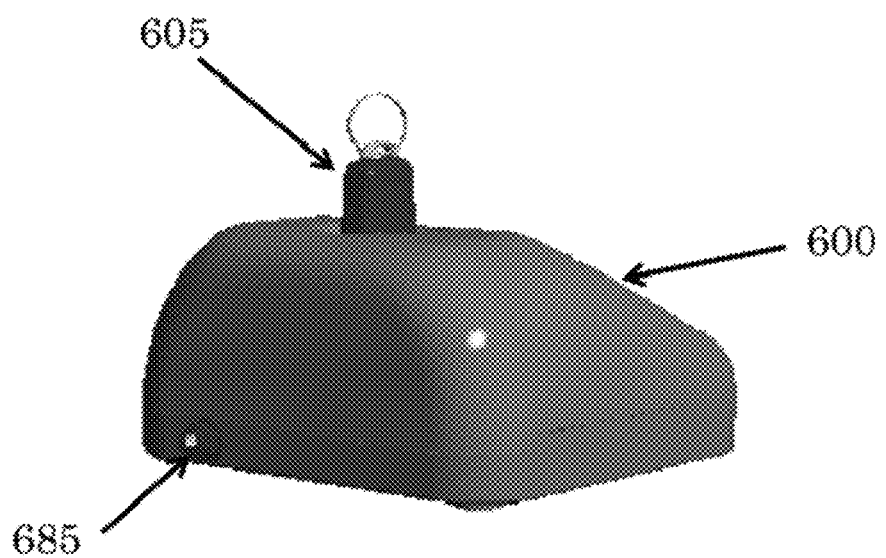
FIG. 6 illustrates one form of the back of the transponder key replication device of FIG. 1.

FIG. 6 is an example of the back of the transponder key replication device. At the back of the transponder key replication device 600 is a connector 685. The connector 685 is used to connect the transponder key replication device 600 to a computer (not shown). The computer obtains the information, the image of the bitting characteristics and the transponder code of the transponder key 605, from the transponder key replication device and uses it to generate a replicated transponder key. The computer takes the information received from the transponder key replication device and analyzes it by measuring the dimensions of the bitting characteristics. The image of the transponder key 605 is analyzed at different positions and depths based on the type of key, which may be identified by a part number. The positions may be the space at which each cut is made, measured from either the tip of the key or the head of the key. The depths may be the cuts made at each position.

Those of ordinary skill in the art may recognize that many modifications and variations of the above may be implemented without departing from the spirit or scope of the following claims. Thus, it is intended that the following claims cover the modifications and variations provided they come within the scope of the appended claims and their equivalents.

What is claimed is:

1. A system for replicating a vehicle transponder key that has a key blade and generates a transponder code associated with a predetermined vehicle, the system comprising:
    a transponder key replication device having:
        an outer shell,
        a bottom,
        a stabilizer that secures a transponder key in a predetermined location at least partially within the outer shell,
        an antenna mounted to the outer shell that reads a transponder code from the transponder key,
        a camera mounted to the bottom that captures bitting characteristics associated with the transponder key blade,
        a memory that stores key data including the read transponder code and the bitting characteristics associated with the transponder key,
        a transmitter configured to transmit the key data from the memory to a remote location, wherein the memory and the transmitter are arranged within the outer shell and the bottom.

2. The system of claim 1, wherein the transponder code is for automobile security.

* * * * *